United States Patent [19]
Schubert

[11] Patent Number: 5,342,553
[45] Date of Patent: Aug. 30, 1994

[54] PROCESS OF MAKING ZINC BORATE AND FIRE-RETARDING COMPOSITIONS THEREOF

[75] Inventor: David M. Schubert, Los Angeles, Calif.

[73] Assignee: U. S. Borax Inc., Valencia, Calif.

[21] Appl. No.: 796,289

[22] Filed: Nov. 22, 1991

[51] Int. Cl.$^5$ .................... C09K 21/02; C01B 35/12
[52] U.S. Cl. ................................ 252/609; 423/280; 423/622
[58] Field of Search ............ 423/276, 277, 279, 280, 423/622; 252/601, 609, 610

[56] References Cited

U.S. PATENT DOCUMENTS

| | | | |
|---|---|---|---|
| Re. 27,424 | 7/1972 | Nies et al. | 23/59 |
| 3,549,316 | 12/1970 | Nies et al. | 23/59 |
| 3,649,172 | 3/1972 | Nies et al. | 23/59 |
| 3,718,615 | 2/1973 | Woods et al. | 260/28 |
| 4,246,246 | 1/1981 | Nakamura | 423/279 |

FOREIGN PATENT DOCUMENTS 60-8331 1/1985 Japan .

OTHER PUBLICATIONS

Robert W. Smith et al., "Framework Alkali Metal Zinc Metaborates: $AZn_4(BO_3)_3$ (A=K,Rb,Cs)", Inorganic Chemistry, 1992, 31, pp. 4679–4682.
Robert W. Smith, Structure and Properties of New, Complex Copper and Zinc Borates, Thesis 1990, Oregon State University, pp. 1–7; 124–145.
Kirk-Othmer, *Encyclopedia of Chemical Technology*, 3rd Ed., vol. 4 (1978) pp. 104–109.
Dafinova, *Journal of Materials Science Letters*, vol. 7, No. 1, Jan. 1, 1988, pp. 69–70.
Bowden et al. Mellor's Inorganic and Theoretical Chemistry, vol. V, Part A, 1980, pp. 572–579.
Lehmann, H.-A. et al, Über Wasserhaltige Zinkborate, Z. Anorg. Chem. 354, pp. 37–43 (1967).
Kazanskaya et al., Crystal Structure of Synthetic Cadium ortho-3 -Borate $Cd_4(BO_3)_2(OH)_2$, Sov. Phys.-Dokl. (English) 23, #6, pp. 368–370 (1978).
Moore et al, Effect of Co-Additives on the Flame/Smoke Suppression Properties of Zinc Borates, Journal of Vinyl Technology, vol. 13, No. 3, pp. 169–173, Sep. 1991.
Fayos et al, Chemical Abstracts 67, 94774 (1967).
Garcia-Blanco et al, Chemical Abstracts 70, 51693 (1969).
Goetz, W. et al., Chemical Abstracts 71, 43187 (1969).
Ozols, J. et al, Chemical Abstracts 71, 65060, (1969).
Baptista, Augusto et al, Chemical Abstracts 71, 25455, (1969).
Nies et al, Chemical Abstracts 72, 23010, (1970).
Guggenberger et al, Chemical Abstracts 72, 26118, (1970).
Baur et al, Chemical Abstracts 73, 102982, (1970).
Martinez-Ripoll et al, Chemical Abstracts 73, 81668, (1970).
Bannykh et al, Chemical Abstracts, 74, 143930, (1971).
Martinez-Ripoll et al, Chemical Abstracts, 75, 26467, (1971).
Whitaker et al, Chemical Abstracts, 76, 132251, (1972).
Chernyshov et al, Chemical Abstracts, 78, 64908, (1973).
Nies et al, Chemical Abstracts 77, 90751, (1972).
Moshkareva et al, Chemical Abstracts 78, 143428, (1973).
Ozols et al, Chemical Abstracts, 78, 165580, (1973).
Yuzawa, Yasushi, Chemical Abstracts, 79, 21099, (1973).
Gabova et al, Chemical Abstracts, 79, 132388, (1973).
Murray et al, Chemical Abstracts, 86, 81036, (1977).
Murray et al, Chemical Abstracts, 87, 175265, (1977).
Murray et al, Chemical Abstracts, 89, 14148, (1978).
Bondareva et al, Chemical Abstracts, 89, 68937, (1978).
Bondareva et al, Chemical Abstracts, 89, 138764, (1978).
Ozols et al, Chemical Abstracts, 90, 130736, (1979).
Nakamura, Senichi, Chemical Abstracts, 92, 61173, (1980).
Smith-Verdier et al, Chemical Abstracts, 93, 35385, (1980).
Birecikli, Chemical Abstracts, 95, 44306, (1981).
Bondareva et al, Chemical Abstracts, 95, 50318, (1981).

*Primary Examiner*—Michael Lewis
*Assistant Examiner*—Stephen G. Kalinchak
*Attorney, Agent, or Firm*—James R. Thornton

[57] ABSTRACT

Zinc borate compositions having a $ZnO:B_2O_3$ ratio of 4:1. The hydrated zinc borate $4ZnO.B_2O_3.H_2O$ and anhydrous zinc borate $4ZnO.B_2O_3$ are especially useful as fire-retardants and smoke-suppressant additives for polymeric compositions.

11 Claims, No Drawings

PROCESS OF MAKING ZINC BORATE AND FIRE-RETARDING COMPOSITIONS THEREOF

This invention relates to improved zinc borate compositions, and more particularly, this invention provides a new hydrated zinc borate having a high dehydration temperature which offers significant advantages for compounding with plastics and rubbers at elevated temperatures. The anhydrous form of the zinc borate is also provided, offering advantages for compounding at even higher temperatures.

BACKGROUND OF THE INVENTION

Many different hydrated zinc borates are known and several find commercial application as fire retardants and smoke suppressants for various polymers. Hydrated zinc borates are also used as anti-corrosive pigments for coatings and have demonstrated fungistatic and bacteriostatic properties which find many applications.

The known hydrated zinc borates include $ZnO.B_2O_3.H_2O$, $2ZnO.3B_2O_3.3.5H_2O$, $2ZnO.3B_2O_3.7H_2O$, $3ZnO.5B_2O_3.14H_2O$ (sometimes designated $2ZnO.3B_2O_3.9H_2O$), $ZnO.B_2O_3.2H_2O$, $ZnO.5B_2O_3.4.5H_2O$, $2ZnO.3B_2O_3.3H_2O$, and $6ZnO.5B_2O_3.3H_2O$. See *Supplement to Mellor's Comprehensive Treatise on Inorganic and Theoretical Chemistry*, Vol. V, Part A, Pages 577–578, Longman Group Ltd (1980). See also pages 572–6 for a review of anhydrous zinc borates. Several of these zinc borate hydrates have commercial importance, especially as fire retardants and smoke suppressants for polymers, rubbers and coatings. The relatively high dehydration temperature (about 290° C.) of $2ZnO.3B_2O_3.3.5H_2O$ offers a significant advantage over other commercially available hydrated zinc borates since elevated temperatures are required for compounding many plastics and rubbers. However, some of the recently developed engineering plastics require processing at even higher temperatures in the range of about 300°–400° C., and it is desirable to have a zinc borate which has an even higher dehydration temperature.

SUMMARY OF THE INVENTION

The present invention provides a new crystalline, hydrated zinc borate having a relatively high dehydration temperature which makes it especially useful for use in polymers requiring processing at high temperatures. The anhydrous form of the zinc borate is also provided.

DESCRIPTION OF THE INVENTION

The hydrated zinc borate of this invention has the formula $4ZnO.B_2O_3.H_2O$. It is a crystalline solid having very slight water solubility and having a dehydration temperature which begins at about 415° C. with a rapid loss occurring above 425° C. Such a high dehydration temperature makes this composition especially useful as an additive for polymers requiring high processing temperatures such as the polysulfones, polyamide-imides, polyketones, polyetherketones and polyarylates. The water solubility of the compound is considerably lower than that of other known hydrated zinc borates.

The zinc borate hydrate of this invention can be readily prepared by a variety of methods. The presently preferred method of production comprises the reaction of zinc oxide with a near stoichiometric amount of boric acid (2:1 mole ratio) in water at an elevated temperature, according to the equation

The reaction preferably takes place near the boiling point of the mixture and is promoted by the presence of previously prepared product seed. The concentration of the initial reaction mixture should be greater than about 5% by weight of starting reagents in order to provide a reasonably rapid reaction rate. Preferably, reaction mixtures in the 10–20% by weight range are employed, since they require only a few hours of refluxing in water to go to completion. It is also preferred that a slight molar excess (approximately 5%) of boric acid is used in order to provide complete consumption of zinc oxide in the reaction. The desired hydrated zinc borate product is readily separated from the cooled reaction solution by filtration and dried to give the desired crystalline product. It has also been found that more consistent results are obtained when boric acid is added to the zinc oxide in boiling water in at least two separate portions, thereby maintaining the pH of the reaction mixture above about 5.5, and the reaction mixture is efficiently stirred or mixed during the reaction period.

Other methods for preparing the hydrated zinc borate of this invention include hydrolysis of the zinc borate $2ZnO.3B_2O_3.3.5H_2O$ in a refluxing aqueous slurry. It has been found that the concentration of the starting material in the aqueous slurry must be less than about 5% in order to produce a complete reaction. At least five days of continuous reflux at atmospheric pressure of a 5% slurry of starting material is required to give complete hydrolysis. Reflux of the reaction mixture containing free boric acid for an excessive period of time (such as for one month) will convert the zinc borate to the compound $6ZnO.5B_2O_3.3H_2O$ which was previously reported as a product of the hydrothermal reaction of zinc oxide and boric acid at 165° C. See Lehmann, H.-A. et al, *Zeitschrift fur Anorganische and Allgemeine Chemie*, 1967, 354, Page 37.

The zinc borate of this invention may also be prepared by reacting $2ZnO.3B_2O_3.3.5H_2O$ with a stoichiometric amount of zinc oxide in refluxing water. This reaction is also facilitated by the presence of seed crystals of previously prepared zinc borate $4ZnO.B_2O_3.H_2O$. In some cases, the reaction appears to be catalyzed by the presence of zinc ion such as supplied by a small amount of zinc chloride or zinc sulfate.

A fourth method for preparing the $4ZnO.B_2O_3.H_2O$ of this invention is by reaction of sodium tetraborate with a zinc salt such as zinc sulfate and zinc oxide in boiling water according to the equation

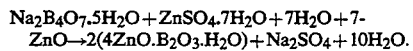

The presence of about 5% seed product facilitates the reaction which goes to completion within a few hours.

EXAMPLES

The following examples illustrate preparation and use of the zinc borates of this invention.

EXAMPLE I

200 Grams of $2ZnO.3B_2O_3.3.5H_2O$ (0.460 mol) was added to 4.5 L of deionized (DI) water and boiled under reflux for six days. During this time the pH of the reaction solution gradually decreased from 7.8 to about 4.5. The reaction slurry was then filtered, washed with DI water and air dried to give 92.2 g (97% yield) of product, $4ZnO.B_2O_3.H_2O$ having the following analysis:

|       | Calc. | Found |
|-------|-------|-------|
| ZnO   | 78.79 | 78.35 |
| $B_2O_3$ | 16.84 | 17.04 |
| $H_2O$  | 4.36  | 4.88  |

Since slight variations in analyses can be expected, a typical composition of the hydrated zinc borate of this invention can be defined as $3.9$–$4.1(ZnO).0.9$–$1.1(B_2O_3).0.8$–$1.2(H_2O)$.

The XRD pattern for the product, set out below, bears no similarity to any known zinc borate compound. The following is the characteristic X-ray diffraction pattern for the hydrated zinc borate.

| 2-THETA/degrees | D/degrees | INTENSITY |
|-----------------|-----------|-----------|
| 22.21 | 3.998 | 100 |
| 18.78 | 4.721 | 94 |
| 28.44 | 3.133 | 58 |
| 36.31 | 2.472 | 55 |
| 31.64 | 2.826 | 39 |
| 21.91 | 4.053 | 35 |
| 37.51 | 2.396 | 32 |
| 33.82 | 2.648 | 31 |
| 37.27 | 2.410 | 23 |
| 32.67 | 2.739 | 20 |
| 42.86 | 2.108 | 19 |
| 40.65 | 2.218 | 19 |
| 55.68 | 1.650 | 17 |
| 48.97 | 1.858 | 16 |
| 23.91 | 3.718 | 13 |

A portion of the filtrate was evaporated to dryness to give a crystalline solid which was identified as boric acid by its XRD pattern.

EXAMPLE II

A 5-L flask was charged with 100 grams (0.23 mole) of the zinc borate $2ZnO.3B_2O_3.3.5H_2O$, 74.9 grams (0.92 mol) of ZnO, 7.2 g. (17 mmol) of previously prepared seed product, and 2.0 L DI water. To this slurry was added 0.5 g of $ZnCl_2$ (3.7 mmol). The mixture was boiled under reflux for six hours with mechanical stirring.

The reaction was then cooled, filtered, and the product air dried to give 146.4 g (98% yield) of $4ZnO.B_2O_3.H_2O$, identified by its XRD pattern.

EXAMPLE III

A 5-L round bottom flask was charged with 488.4 g. of ZnO (6 mol) and 3.5 L of DI water. This slurry was brought to a boil and 28.0 g. of previously prepared seed (0.07 mol) and 97.4 g of boric acid (1.58 mol) was added. After boiling this mixture under reflux with stirring for 2.5 hours, another portion of boric acid (97.4 g.; 1.58 mol) was added. After refluxing with stirring for another 2.5 hours, the reaction mixture was cooled and filtered. The solid product was washed with DI water and air dried to give 629.2 g (97% yield) of $4ZnO.B_2O_3.H_2O$.

EXAMPLE IV

Sodium tetraborate pentahydrate (45.9 g.; 0.158 mol) was dissolved in 1.0 L of hot DI water in a 5-L flask. To this solution was added 43.1 g of $ZnSO_4.H_2O$ (0.15 mol) dissolved in 250 mL water. A white precipitate formed immediately. This mixture was brought to a boil and ZnO (85.5 g.; 1.05 mol) and 6.2 g of previously prepared seed (15 mmol) were added. The reaction mixture was boiled under reflux for six hours. The reaction was cooled, filtered, washed with water and air dried to give 132.7 g (97% yield) of $4ZnO.B_2O_3.H_2O$ containing some residual zinc oxide.

Zinc borate $4ZnO.B_2O_3$

Zinc borate $4ZnO.B_2O_3$ can be prepared by the dehydration of the hydrated zinc borate $4ZnO.B_2O_3.H_2O$. The dehydration is readily accomplished by heating the hydrated borate at a temperature above 415° C. for a period of time sufficient to remove essentially all water. Generally heating at a temperature in the range of about 500° to 550° C. for about 3 to 5 hours will produce good yields of the desired $4ZnO.B_2O_3$.

The zinc borate $4ZnO.B_2O_3$ is non-hygroscopic and is resistant to rehydration even under high humidity conditions. This offers a significant advantage over many other anhydrous metal borate compounds which are often appreciably hygroscopic.

EXAMPLE V

A 50.0 gram (0.12 mol) sample of the zinc borate hydrate of this invention was heated in a furnace at 500°–550° C. for about 4 hours. This resulted in a weight loss of 2.2 grams, corresponding to the loss of 0.12 mol of water.

To test for moisture reabsorption, a sample of the resulting anhydrous zinc borate was placed in an open container in a humidity chamber maintained at 90% relative humidity and 90° F. for one month. After this time, a sample of this material was subjected to thermogravimetric analysis (TGA). Less than 0.1% weight loss was detected upon slowly heating the material over a period of about 2 hours from room temperature to 700° C., indicating that very little moisture was absorbed during prolonged storage under high humidity conditions. Furthermore, no significant weight loss was found when this material was heated continuously at 400° C.

The zinc borate compounds of this invention are useful as fire retardant and smoke suppressant additives for a wide range of organic polymer compositions. The polymer systems include the well-known polymers, rubbers and coatings compositions. Examples of such compositions are polyvinyl chloride (flexible and rigid), nylons, polyolefins (e.g. polyethylene, polypropylene, and ethylene-propylene elastomers such as EPM and EPOM), chlorinated polyolefins, ethylene vinyl acetate, acrylates and acrylic copolymers, polyurethanes (flexible and rigid), polystyrenes, polybutadiene, polyesters, styrene-butadiene rubbers, acrylonitrilebutadiene-styrene (ABS), polysulfones, silicones, neoprene, fluoroelastomers (e.g. ETFE and FEP), cellulosics, polyphenylene oxide, polyethers, polyether imides, polyetherketones, polyethersulfones, epoxies, polycarbonates, phenolics, polyarylates, polyamides, melamine-formaldehyde and alloys and blends of the above.

The zinc borate is incorporated in the polymer systems at levels of from about 1 to 40 parts by weight of additive per 100 parts of resin (phr). Preferably, about 2 to 20 phr is added for best fire retardancy. The polymer systems may also contain other additives which are conventionally used in such compositions, including antimony oxide, alumnia trihydrate, stabilizers, plasticizers, halogenating agents, fillers such as calcium and magnesium carbonates, pigments, etc.

The following examples are illustrative of polymer compositions containing the zinc borates of this invention.

EXAMPLE VI

Flexible polyvinyl chloride compositions were prepared with variable amounts of the zinc borates $4ZnO \cdot B_2O_3 \cdot H_2O$ and $4ZnO \cdot B_2O_3$. The formulations were as follows in which parts are by weight.

TABLE I

|  | Formulation No. | | | | | | |
| --- | --- | --- | --- | --- | --- | --- | --- |
|  | 1 | 2 | 3 | 4 | 5 | 6 | 7 |
| GEON 30 (PVC) | 100 | 100 | 100 | 100 | 100 | 100 | 100 |
| Dioctylphthalate | 50 | 50 | 50 | 50 | 50 | 50 | 50 |
| Epoxidized Soya Oil | 5 | 5 | 5 | 5 | 5 | 5 | 5 |
| Stabilizer (Therm-Chek 120) | 3 | 3 | 3 | 3 | 3 | 3 | 3 |
| Alumina Trihydrate | 30 | 30 | 30 | 30 | 30 | 30 | 30 |
| Antimony Oxide | 0 | 1.25 | 2.5 | 3.75 | 5.0 | 7.5 | 12.5 |
| $4ZnO \cdot B_2O_3 \cdot H_2O$ | 0 | 1.25 | 2.5 | 3.75 | 5.0 | 7.5 | 12.5 |

|  | Formulation No. | | | |
| --- | --- | --- | --- | --- |
|  | 8 | 9 | 10 | 11 |
| GEON 30 (PVC) | 100 | 100 | 100 | 100 |
| Dioctylphthalate | 50 | 50 | 50 | 50 |
| Epoxidized Soya Oil | 5 | 5 | 5 | 5 |
| Stabilizer (Therm-Chek 120) | 3 | 3 | 3 | 3 |
| Alumina Trihydrate | 30 | 30 | 30 | 30 |
| Antimony Oxide | 0 | 2.5 | 7.5 | 12.5 |
| $4ZnO \cdot B_2O_3$ | 0 | 2.5 | 7.5 | 12.5 |

The formulations were pressed into test articles and the fire retardancy determined by measuring the limiting oxygen index (LOI) according to the procedure of ASTM D 2863. The results are given in Table II.

TABLE II

| Formulation No. | LOI |
| --- | --- |
| 1 | 25.6 |
| 2 | 28.1 |
| 3 | 30.0 |
| 4 | 32.5 |
| 5 | 32.9 |
| 6 | 35.8 |
| 7 | 36.1 |
| 8 | 25.6 |
| 9 | 29.8 |
| 10 | 32.3 |
| 11 | 33.9 |

Smoke suppressant efficacy was determined by measuring the specific optical density Dm(Corr) of smoke generated by burning test samples using a NBS smoke chamber according to the procedure of ASTM E662. The results are set forth in Table III.

TABLE III

| Formulation No. | Dm (Corr) |
| --- | --- |
| 1 | 184 |
| 2 | 157 |
| 5 | 122 |
| 7 | 126 |

EXAMPLE VII

The compounds of this invention are also useful as anti-corrosion additives for polymeric coating compositions. To test the hydrated zinc borate $4ZnO \cdot B_2O_3 \cdot H_2O$, cold rolled steel test panels coated with an unoptimized medium oil alkyd primer paint containing this material were subjected to continuous salt spray conditions according to the standard test method ASTM B117. Negative controls, consisting of identical steel panels coated with equivalent paint formulations without the zinc borate, were treated simultaneously under the same conditions. The pigment volume concentrations of the two test paints were maintained at the same level by adjusting the volume of extender, calcium carbonate, used in the formulations. The test paint formulations are given in Table IV. The test paints were each applied to three replicate degreased, burnished standard cold rolled steel test panels using a standard drawdown bar to provide coatings having a dry film thickness of 2 mils. After drying for one week at room temperature the panels were scribed with a St. Andrew's cross and placed into a standard salt spray chamber. After 400 hours of continuous salt spray exposure at 95° F. the panels were removed and evaluated for blistering according to the standard method ASTM D714. The paint film was then stripped using paint remover and the metal surface was evaluated for rusting according to the standard method ASTM D610. The results of these tests are given in Table V.

TABLE IV

|  | Formulation No. | |
| --- | --- | --- |
|  | I | II |
| Pigment Grind: | | |
| Aroplaz 1082-M-50 alkyd resin | 265.3* | 265.3 |
| Bentone SD-1 | 4.6 | 4.6 |
| Mineral Spirits | 42.4 | 42.4 |
| Calcium Carbonate | 88.0 | 159.8 |
| Titanium Dioxide | 212.1 | 212.1 |
| Mica | 27.0 | 27.0 |
| $4ZnO \cdot B_2O_3 \cdot H_2O$ | 100.0 | — |
| Grind at high speed for 15 minutes and letdown at slow speed. | | |
| Letdown: | | |
| Aroplaz 1082-M-50 | 159.1 | 159.1 |
| Mineral Spirits | 140.1 | 140.1 |
| 4% Calcium Drier | 6.4 | 6.4 |
| 6% Cobalt Drier | 1.3 | 1.3 |
| 6% Zirconium Drier | 3.8 | 3.8 |
| Antiskinning Agent | 1.3 | 1.3 |

*parts by weight

TABLE V

| Formulation | Blistering | | Rust Grade[3] | Undercutting |
| --- | --- | --- | --- | --- |
|  | Frequency[1] | Size[2] |  |  |
| I (Zinc Borate) | F | S8 | 9 | Slight |
| II (Control) | MD | S2 | 3 | Considerable |

[1]ASTM D714 blister frequency:
F = Few
M = Medium Dense
[2]ASTM D714 rates blister size on a numerical scale of 0 to 10 in which blister increases from S10 (no blisters) to S0 (very large blisters).
[3]ASTM D610 rust grade 9 corresponds to minute rusting (less than 0.03% of the surface); rust grade 3 corresponds to rusting over approximately one sixth of the surface.

The very low water solubility of the compounds of this invention make them especially useful for applications in plastics and coatings where very low leaching rates are desirable, such as under conditions of submersion in water or exposure to weathering.

Various changes and modifications of the invention can be made and, to the extent that such variations incorporate the spirit of this invention, they are intended to be included within the scope of the following claims.

What is claimed is:

1. The method of producing a crystalline zinc borate of the formula $4ZnO.B_2O_3.H_2O$ which comprises reacting zinc borate of the formula $2ZnO.3B_2O_3.3.5H_2O$ with zinc oxide in boiling water.

2. The method of producing a crystalline zinc borate of the formula $4ZnO.B_2O_3.H_2O$ which comprises reacting sodium tetraborate with a zinc salt in boiling water.

3. A fire-retardant polymer composition comprising an organic polymer and a fire-retarding amount of zinc borate having the formula $3.9-4.1(ZnO)0.9-1.1(B_2O_3)0.8-1.2(H_2O)$.

4. A fire-retardant polymer composition according to claim 3 in which said zinc borate is a crystalline hydrated zinc borate of the formula $4ZnO.B_2O_3.H_2O$.

5. A fire-retardant polymer composition according to claim 3 in which said organic polymer is processed at temperatures in the range of about 300°–400° C.

6. The method of producing fire-retardant polymer compositions which comprises incorporating a fire-retarding amount of a zinc borate having the formula $3.9-4.1(ZnO)0.9-1.1(B_2O_3)0.8-1.2(H_2O)$ in said polymer.

7. A method of producing a crystalline zinc borate of the formula $4ZnO.B_2O_3.H_2O$ which comprises reacting zinc oxide with boric acid in a mole ratio of about 2:1 in an aqueous solution at an elevated temperature about the boiling point of the mixture, thereby forming said crystalline zinc borate and separating said crystalline zinc borate from said aqueous solution.

8. The method according to claim 7 in which a slight molar excess of boric acid is present and said reaction is in the presence of previously prepared seed crystals of said zinc borate.

9. The method according to claim 7 in which said boric acid is added in at least two portions to said zinc oxide in boiling water, thereby maintaining the pH of the reaction mixture above about 5.5.

10. A method of producing a crystalline zinc borate of the formula $4ZnO.B_2O_3.H_2O$ which comprises reacting zinc oxide with boric acid or salt thereof in a mole ratio of about 2:1 calculated as the boric acid, in water at an elevated temperature about the boiling point of the mixture for a period of time sufficient to form said crystalline zinc borate $4ZnO.B_2O_3.H_2O$.

11. The method according to claim 10 in which said reaction takes place at the boiling temperature of the water.

* * * * *